United States Patent [19]

Diekman et al.

[11] Patent Number: 4,585,246
[45] Date of Patent: Apr. 29, 1986

[54] BICYCLE FRAME WITH INTERNAL CABLE

[75] Inventors: Robert L. Diekman; Timothy J. Dietz, both of Centerville, Ohio

[73] Assignee: Huffy Corporation, Dayton, Ohio

[21] Appl. No.: 677,706

[22] Filed: Dec. 4, 1984

[51] Int. Cl.⁴ ............................................. B62K 19/30
[52] U.S. Cl. ............................................... 280/281 R
[58] Field of Search ......... 280/281 R, 281 LP, 289 R; 188/24.22, 24.21

[56] References Cited

U.S. PATENT DOCUMENTS

| 1,117,916 | 11/1914 | Schmidt | 280/281 R |
| 2,080,698 | 5/1937 | Clark | 280/281 R |
| 4,230,332 | 10/1980 | Porsche | 280/281 R |

FOREIGN PATENT DOCUMENTS

| 78551 | 5/1983 | European Pat. Off. | 280/281 R |
| 68892 | 3/1892 | Fed. Rep. of Germany . | |
| 897769 | 3/1945 | France . | |
| 982877 | 6/1951 | France . | |
| 432825 | 3/1948 | Italy . | |
| 261528 | 8/1949 | Switzerland . | |

Primary Examiner—John A. Pekar
Attorney, Agent, or Firm—Biebel, French & Nauman

[57] ABSTRACT

A bicycle frame of the type having a head tube, a seat bracket and a bottom bracket, each having hollow lugs extending therefrom and joined together by cylindrical tubes extending over and attached to the lugs, having an internal cable system in which the top lugs of the head tube and seat bracket each have a cable outlet, and a cable, such as a brake cable, is threaded through the cable outlets and along the tube joining the head tube and seat bracket. The cable outlet of the head tube is positioned immediately adjacent to the open, tubular segment of the head tube. Positioning the outlets on the lugs preserves the structural integrity of the top tube and facilitates replacement of the cable. Replacement is effected by pushing the cable through the cable outlet of the seat bracket, along the tube to the head tube, then out through the head tube cable outlet. The cable tip may be guided through the head tube cable outlet by inserting one's index finger through the head tube opening to deflect the cable tip toward the head tube cable outlet.

3 Claims, 6 Drawing Figures

BICYCLE FRAME WITH INTERNAL CABLE

BACKGROUND OF THE INVENTION

The present invention relates to bicycle frames and, more particularly, bicycle frames in which the control cables extend through the interiors of structural frame members.

In the manufacture of bicycles of the type having control cables for such components as, for example, caliper brakes, it is necessary to provide means for attaching the cables to the structural components of the bicycle frame. In most bicycles of this type, the cables are attached to the exterior of the frame by clips or bands made of such materials as steel or nylon. While such means of attaching cables to bicycle frames are effective and relatively inexpensive, they tend to distract from the aesthetic appearance of the frame. In addition, the location of the cables on the exterior of the frame members may tend to interfere with other components of the bicycle, such as tool compartments, which are also attached to the frame exterior.

In order to eliminate the appearance of cables on the exterior of bicycle frames, attempts have been made to extend the cables through the interiors of tubular frame components. For example, the Artaud French Pat. No. 982,877 shows a bicycle frame in which the top tube consists of a hollow, tubular member having a forward cable outlet at a location near the head tube socket which is attached to the top tube, and a rearward cable outlet adjacent to the seat mast of the bicycle frame. While the internal cable system of this frame eliminates the appearance of the cable on the exterior of the frame components, a new problem is created. There is no provision for the rapid replacement of the cable which extends through the interior of the top tube of that device.

In the event of the excessive wear or breakage of the cable extending through the top tube of that frame, it might be necessary to disassemble the top tube from the head tube and seat bracket in order to expose the interior of the top tube so that a new cable may be guided through the cable outlets. Another possibility of replacing a cable would involve the insertion of a stiff lead wire through the rear cable outlet, along the top tube and out through the forward cable outlet. The end of a replacement cable would then be attached to the end of the wire, and the wire withdrawn back through the top tube and rear cable outlet, thereby drawing the replacement cable after it. Such a replacement method would be time-consuming and frustrating, if it worked at all.

Another disadvantage of internal cable systems typified by the Artaud device is that the forming of openings along the top tube of a bicycle frame tends to weaken the wall of that tube, which would require either that the tube be made of a strong but heavy material such as steel, or that the tube walls be thickened if made of a relatively light material which would also add to the overall weight of the frame.

Accordingly, there is a need for an internal cable system in which the installation and replacement of the cable is a relatively easy process. Furthermore, there is a need for an internal cable system for a bicycle frame in which the structural integrity of the tubes housing the cable is not compromised.

SUMMARY OF THE INVENTION

The present invention is a bicycle frame having an internal cable system in which a cable extends through the head tube, along the top tube and out through the seat bracket, so that the cable is substantially protected and enclosed by frame components from the forward end of the frame to its rearward end. The bicycle frame is of the type having a head tube including an open tubular segment adapted to receive a fork stem and a handlebar stem assembly therethrough, a seat bracket including a body having a seat post opening therethrough, and a bottom bracket adapted to receive a pedal crank therethrough. These components each include lugs having inserts, and are joined by tubes fitted over and attached to the inserts.

The head tube includes a first, hollow top lug defining a passage communicating with the open segment of the head tube, and the seat bracket includes a second, hollow top lug defining a passage communicating with the seat post opening. The top tube, which extends between the head tube and seat bracket, includes ends which are fitted over and attached to inserts comprising the outer portions of the first and second top lugs and defines a conduit communicating with the passages formed in the top lugs. The first top lug includes a first base extending from the tubular segment of the head tube and abutting the end of the top tube, and the second top lug includes a second base extending from the body of the seat bracket and abutting the opposite end of the top tube.

The first base defines a forward cable outlet which is located immediately adjacent to the tubular segment of the head tube, and the second base defines a rearward cable outlet adjacent to the seat post opening. The cable, which in the preferred embodiment is a Bowden-type caliper brake cable, extends through the forward cable outlet, the first lug passage, the conduit formed by the top tube, the second lug passage, and out through the rearward cable outlet.

An advantage of the bicycle frame of the present invention over prior art frames having internal cable systems is that installation and replacement of the cable are relatively easy matters. If a cable is to be replaced, the old cable is first removed by disconnecting it from the caliper brakes and brake handle, then pulling it through the lug passages and top tube. The tip of a new cable is inserted through the rearward cable outlet and is pushed through the second lug passage, along the top tube to the first lug passage. The internal stiffness of the cable is sufficient to enable the cable to be pushed through these components without requiring other stiffening means such as a wire.

To guide the cable tip through the forward cable outlet, the handlebar stem and fork stem are removed from the head tube, thereby clearing the tubular segment of the head tube and exposing the first lug passage. One's index finger is then inserted into the tubular segment and into the first lug passage to deflect the cable tip sideways toward and through the forward cable outlet.

Another advantage of the frame of the present invention is that the top tube may be formed of a continuous segment of tubing and is not weakened by the formation of holes along its length to provide cable outlets. The top lugs of the head tube and seat brackets may be made thicker to compensate for the formation of a cable outlet without adding measurably to the overall weight of the bicycle frame.

Accordingly, it is an object of the present invention to provide a bicycle frame with an internal cable system such that a cable, such as a brake cable, extends through the interiors of the head tube, top tube and seat bracket; a bicycle frame having an internal cable system in which the cable may be inserted or replaced easily; and a bicycle frame having an internal cable system in which the strength and integrity of the top tube is not compromised.

Other objects and advantages of the invention will become apparent from the following description, the accompanying drawings and the appended claims.

DETAILED DESCRIPTION OF THE PREFERRED EMBODIMENT

Figure 1:
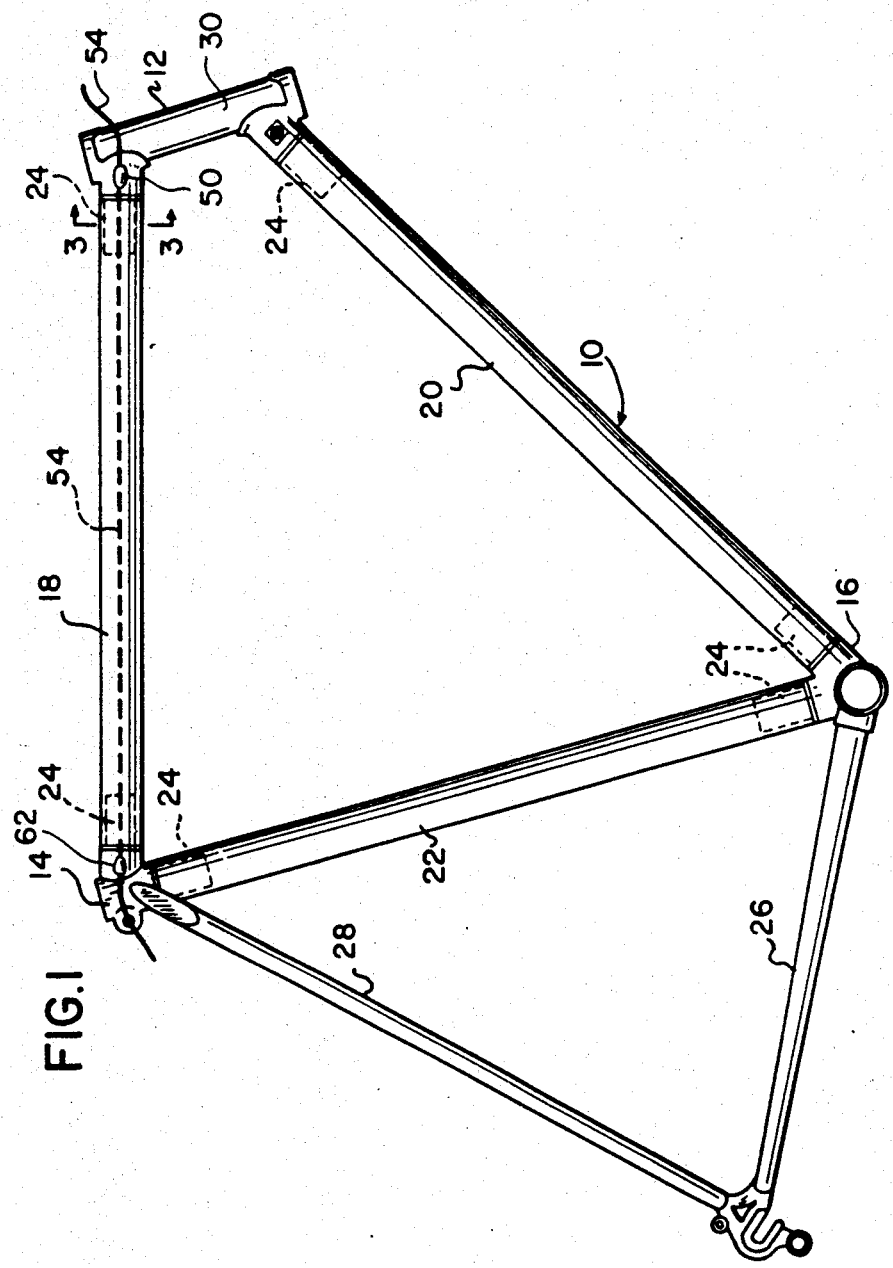
FIG. 1 is a side elevation of the bicycle frame of the present invention.

As shown in FIG. 1, the bicycle frame of the present invention, generally designated 10, includes a head tube 12, seat bracket 14, and bottom bracket 16. The head tube 12 and seat bracket 14 are joined by a top tube 18, the head tube and bottom bracket 16 are joined by a down tube 20, and the seat bracket 14 and bottom bracket are joined by a seat mast 22. Each of the head tube 12, seat bracket 14 and bottom bracket 16 includes a pair of hollow, tubular lugs 24 which telescope into and are secured to the hollow tubes 18-22. The frame 10 also preferably includes a pair of chain stays 26 which extend rearwardly from the bottom bracket 16, and a pair of seat mast stays 28 which extend from the seat bracket 14 and are joined to the chain stays 26.

The structures of the lugs 24 of each of the head tube 12, seat bracket 14 and bottom bracket 16 are identical, as are the connections between the tubes 18-22 and the head tube and brackets. Accordingly, the explanation of the frame structure will be limited to the connection between the top tube 18 and the lug 24 of the head tube 12, with the understanding that the explanation applies to the other connections and inserts of the frame 10 as well.

The head tube 12 includes a tubular segment 30 which is adapted to receive a handlebar stem (not shown) in its upper end and a fork stem (not shown) in its lower end. The lug 24 shown in FIGS. 2 and 3, which hereinafter shall be designated the "top lug 24," includes an insert 32 which is hollow and communicates with the tubular segment 30. The insert 32 of the top lug 24 is preferably formed integrally with the top lug 24. However, the insert 32 may be formed as a separate piece and attached to the top lug 24 by means such as press fitting, welding or brazing.

The top lug 24 also includes a squared shoulder 34 which forms a seat for a trim ring 36 and is adjacent to a base 38 of the lug 24. The top tube 18 forms a hollow cable conduit 39 and includes a squared end 40 which telescopes over the insert 32 and is attached thereto preferably by an adhesive applied to the tip 42 of the insert and by press fitting over an enlarged inner portion 44. The adhesive 46 (shown in FIG. 3) forms a bond between the tip 42 and the inner wall of the squared end 40. This structure is also shown and described in a copending application of Diekman et al. entitled "Bicycle Frame" Ser. No. 677,707, filed Dec. 12, 1984, the disclosure of which is incorporated herein by reference.

Figure 2:
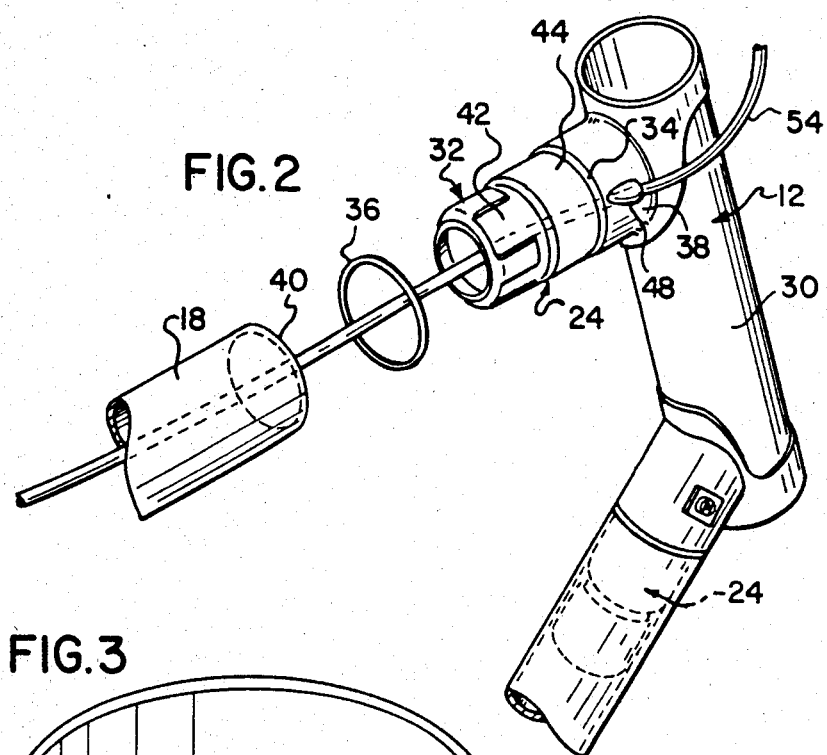
FIG. 2 is a detail in perspective showing the head tube of the frame of FIG. 1, in which the top tube is exploded therefrom.
Figure 3:
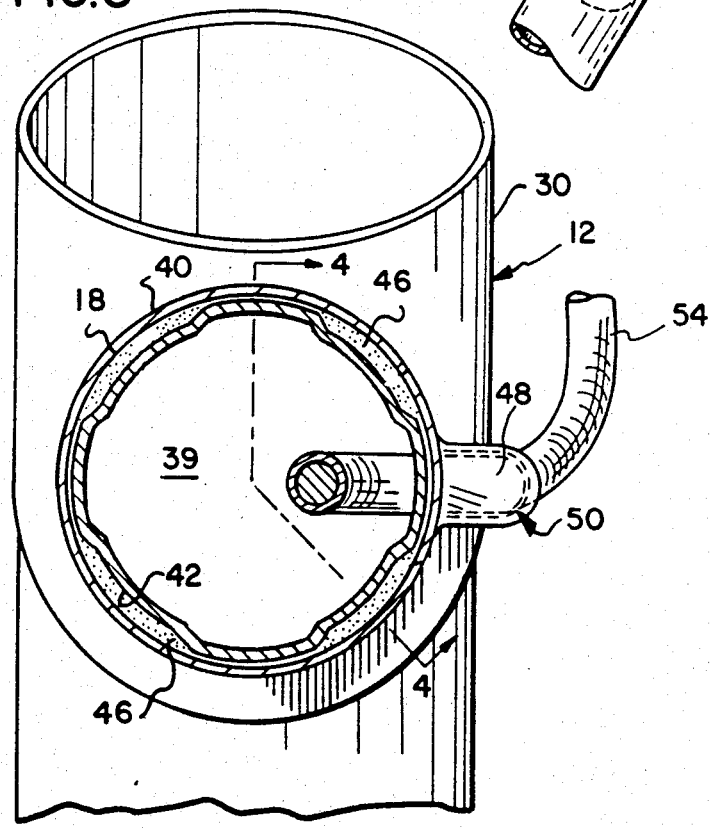
FIG. 3 is a detail of the head tube shown in FIG. 1, taken at line 3—3 thereof.
Figure 4:
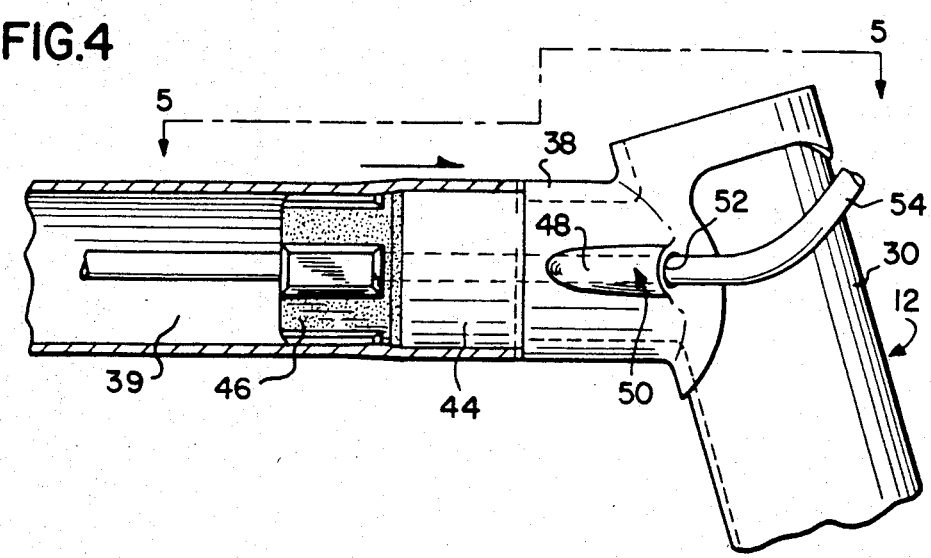
FIG. 4 is a side elevation of the detail of FIG. 3 in which the top tube is in section, taken at line 4—4 thereof.

As shown in FIGS. 2, 3 and 4, the base 38 of the top lug 24 includes a raised blister 48 which defines a forward cable outlet 50. The forward cable outlet includes a cable opening 52 sized to receive a cable 54, which in the preferred embodiment is a Bowden-type caliper brake cable of conventional design. However, cable 54 could also be any of a number of such bicycle cables, such as a shifter cable, an electrical cable or the like, and not depart from the scope of the invention. It should be noted that the forward cable outlet 50 must be positioned on the base 38 at a location immediately adjacent to the tube segment 30 of the top tube 12. It should also be noted that the present invention may be utilized with a standard lugged frame in which the components are brazed together, provided that the head tube and seat bracket include sockets or bases similar to base 38 so that the cable outlet could be positioned adjacent the tube segment of the head tube.

Figure 6:
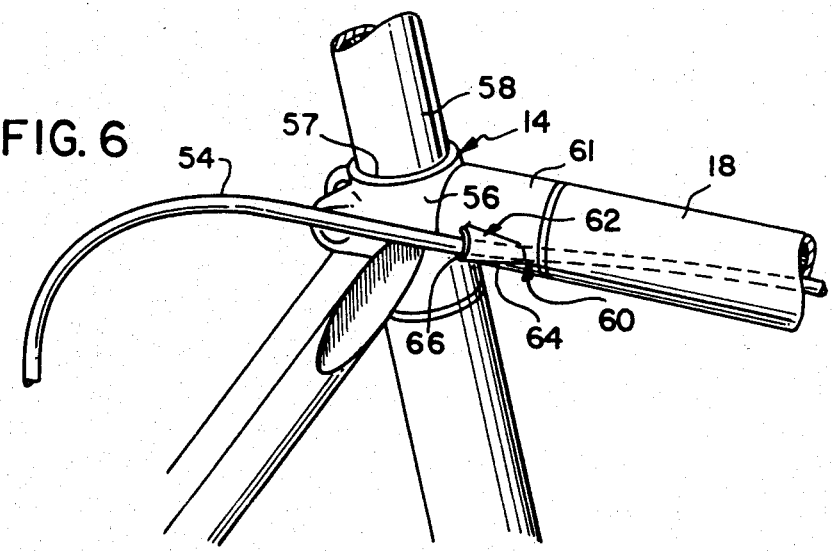
FIG. 6 is a detail in perspective of the seat bracket portion of the frame of FIG. 1.

As shown in FIG. 6, the structure of the seat bracket 14 preferably is similar in all pertinent respects to that of head tube 12. The seat bracket 14 includes a body 56 forming an opening 57 adapted to receive a seat post 58 and a rearward lug 60. The base 61 of the rearward top lug 60 includes a rearward cable outlet 62 which comprises a raised blister 64 having an opening 66 sized to receive the cable 54 therethrough. Both the rearward cable opening 66 and forward cable opening 52 are skewed relative to the outer surface of their respective lug portions 60, 32, to facilitate the insertion and removal of the cable 54.

To insert the cable 54 through the top portion of the frame 10, whether the insertion be for the original brake cable or for a replacement cable, the leading tip (not shown) of the cable is inserted through the rearward cable opening 66 and the cable fed through the top lug 60 and conduit 39. The cable tip is then fed from the top tube 18 through the tubular insert 24 until the tip is immediately adjacent to the forward cable outlet 50 of the top lug 32.

Figure 5:
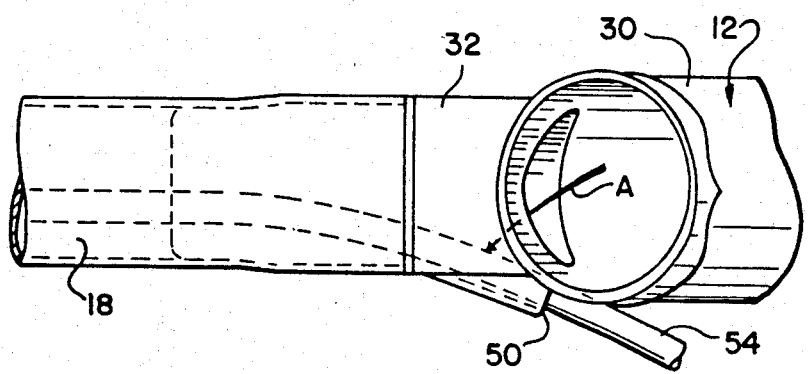
FIG. 5 is a top plan view of the detail of FIG. 4, taken at line 5—5 thereof.

At this time, the fork stem and handlebar stem are removed from the tube segment (if they have already been attached) and the index finger of the installer is inserted into the top of the tubular segment. The cable tip is then deflected to the forward cable outlet 50 in a manner indicated by arrow A in FIG. 5. With the preferred frame 10, the cable replacement procedure also could be effected by inserting the cable 54 through the forward opening 52 and along the top tube 18 to the base 61 of the seat bracket 14. The cable tip could then be guided to the outlet 66 by using one's finger inserted into the opening 57 of the bracket body 56.

While the form of apparatus herein described constitutes a preferred embodiment of this invention, it is to be understood that the invention is not limited to this precise form of apparatus, and that changes may be made therein without departing from the scope of the invention:

What is claimed is:

1. A bicycle frame comprising:
   a head tube including a tubular segment having a hollow interior and upper and lower open ends, said segment being adapted to receive a fork stem and a handlebar stem assembly therethrough;
   first lug means having a tubular shape and a hollow interior and connected at an end thereof to said tubular segment adjacent to one of said open ends thereof such that said hollow interior of said first lug means communicates with said hollow interior of said tubular segment to form a continuous passage, said first lug means including a base portion adjacent to said tubular segment and having a forward cable outlet therethrough communicating with said interior of said lug means, and a first insert portion extending outwardly from said base portion; and
   tube means having a continuous wall and a first open end telescoping over said first insert of said first lug means, whereby a cable may be inserted through said forward outlet and extend therefrom through interiors of said first lug means and tube means, said adjacent open end of said tubular segment providing access to said interior of said first lug means ajacent to said forward cable outlet.

2. The bicycle frame of claim 1 further comprising:
   a seat bracket including a body having a hollow interior and upper and lower open ends, said body being adapted to receive a seat post therethrough;
   second lug means having a tubular shape and a hollow interior and connected at an end thereof to said body adjacent to one of said open ends thereof such that said hollow interior of said second lug means communicates with said hollow interior of said body to form a continuous passage, said second lug means including a second base portion adjacent to said body and having a rearward cable outlet therethrough communicating with said interior of said second lug means, and a second insert portion extending outwardly from said second base portion; and
   said tube means having a second open end telescoping over said second insert portion of said second lug means, whereby a cable may be inserted through said rearward outlet and extend therefrom through interiors of said second lug means and tube means, said adjacent open end of said body providing access to said interior of said second lug means adjacent to said rearward cable outlet.

3. The frame of claim 2 wherein said cable outlets each include a raised blister having an opening disposed at a skewed angle to associated outer surfaces of said top lugs.

* * * * *